INVENTORS:
BERNHARD MOLL, OTTO KRIEGBAUM, ALBERT DIEM

INVENTORS:
BERNHARD MOLL, OTTO KRIEGBAUM, ALBERT DIEM,
BY
ATTORNEYS

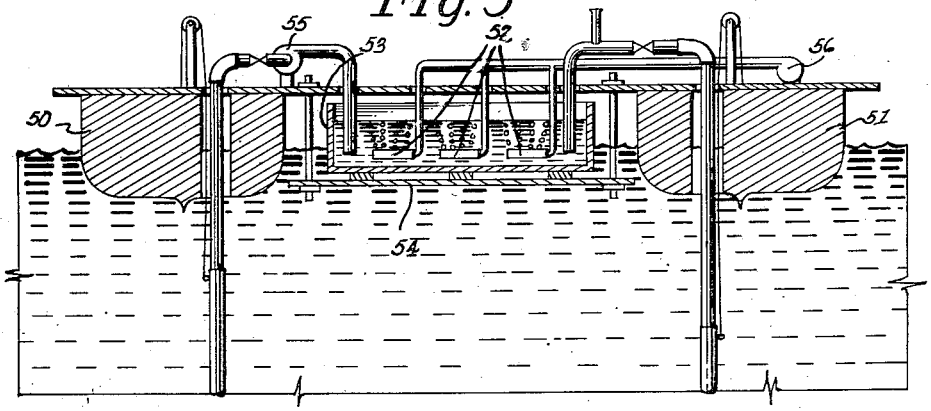
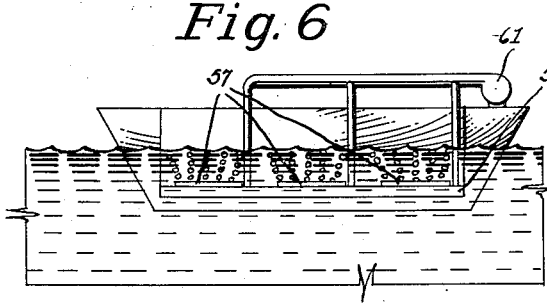
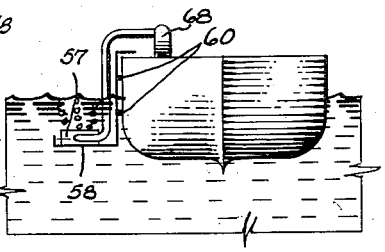
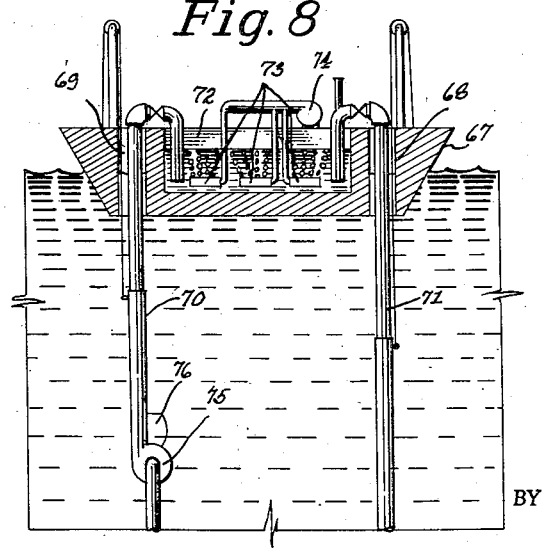
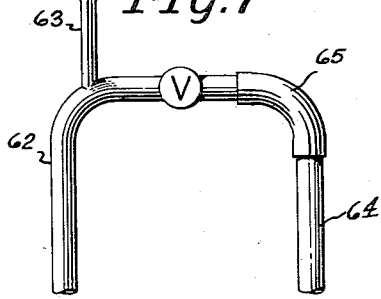

United States Patent Office 2,825,541
Patented Mar. 4, 1958

2,825,541

MEANS FOR AERATING WATER

Bernhard Moll, Wesseling, Otto Krieghbaum, Furth, and Albert Diem, Erlangen, Germany, assignors of one-third to Union Rheinische Braunkohlen Kraftstoff Aktiengesellschaft, Wesseling, Germany, a corporation of Germany, one-third to said Krieghbaum and one-third to said Diem Application December 9, 1953, Serial No. 397,108

Claims priority, application Germany December 10, 1952

6 Claims. (Cl. 261—29)

The present invention relates to methods and means for aerating water of lakes, ponds, rivers and other watercourses and has for its particular object the provision of an economic method and means for supplying gaseous substances, such as air and oxygen, to water.

The water of a great many watercourses and lakes is in an unnatural state due to interferences by human beings, for instance by the discharge of non-clarified liquid effluents from industrial plants and the building of dam steps. The contaminations or pollutions deplete the oxygen content of water, especially in deep layers, and accumulate into sediments consisting of organic sludges which impart objectionable tastes and odors to the water in the anaerobic decomposition. For instance, the oxygen content of some lower layers of water of the Lake of Zurich (Switzerland), which has been investigated especially carefully, is below the minimum required for giving sustenance to fish life. This oxygen-poor zone progressively extends to higher layers of the lake so that the water, which is taken at present for drinking purposes from a depth of about 40 meters and is of suitable quality for human beings to drink, may cause health hazards some day. The water of other lakes, for instance the lake of Ploen (Germany), which has no great depth, was found to be also low in oxygen. Furthermore abundant quantities of sludge consisting of organic matter were ascertained as sediments in front of the dam steps in the Neckar and Main (tributaries to the Rhine) some years after these dam steps had been built. Because of the low velocity of the flowing water this sludge is not carried away, not even in flood periods, thus giving rise to noxious odors, especially at summer temperatures, and causing fish to depart for cleaner waters. These nuisances can be prevented or at least reduced by supplying to the water appropriate quantities of oxygen causing the decay of organic matter. Such decay yields nutrition for lower living matter and, indirectly, for the fish, the lakes and watercourses recovering thereby their original state of health. Because of the higher specific gravity of water at lower temperatures the bottom and the lower layers of stagnant waters are colder than the upper layers. The water at and near the surface takes its oxygen demand from the atmospheric air—this oxygen absorption is favored by wind and wave action—whereas the lower layers are scarcely supplied with oxygen. The oxygen content of the lower layers of water is further reduced by the decay of organic matters sinking down from the upper layers. At the beginning of winter, when the upper layers are chilled to a temperature near the freezing point, they become heavier than the lower, (now warmer) layers, thus causing vertical water movements, that means the water at and near the surface, which is high in dissolved oxygen, sinks down while the oxygen-poor water rises up from the depth. Such supply with oxygen occurring but once a year, however, is quite inadequate in lakes having to digest abundant quantities of organic matter.

Many attempts have been made to remedy the above said obnoxious conditions and to render lakes and watercourses again suitable for aquatic life and safe as sources of potable water for human use.

It has been proposed, for instance, to aerate surface waters by circulation by means of appropriate impellers. This method, however, does not prevent the cold and heavy water, which is elevated from the depth, from sinking again down immediately. Another method of supplying atmospheric oxygen to water in lakes and watercourses is carried out by drawing in the water and spraying it about in the atmosphere. This method, however, is not economic since it requires performance with a high-pressure pump. Finally, it has been proposed to supply compressed air to the bottom of lakes. Also this method requires a considerable consumption of energy since, for instance in the case of the Lake of Zurich, air must be injected under a pressure of about 10 or more atmospheres. Furthermore, the oxygen absorption achieved with aerators adapted for the latter method is mostly insufficient.

A good aerating effect can be obtained for instance by means of aerators comprising appropriately shaped bodies containing or consisting of ceramic material, through which air is passed into water in very fine, small bubbles, thus offering a large surface for the gas exchange. This kind of aerator reaches its maximum efficiency and highest economy by passing water over them in a thin film and passing air through them under slight pressure. The operation of aerators of this type, which are arranged and positioned on land, allows of air-conditioning only the water close to the banks of a river or to the edge of a lake so that a large number of aerators, though of a small size, are required to obtain good results.

In accordance with the invention the aforesaid disadvantages can be avoided by arranging and positioning at least one aerator, for instance of the aforedescribed type, on or inside a locomotive floating body, for instance a ship. Furthermore, the aerators may be arranged on the outer hull plating of a ship and also between two ships. The aerators are preferably placed in appropriately constructed container means, for instance basins or tanks, having an inlet through which the water under treatment enters and an outlet through which the water is discharged after aeration. Due to its freedom to move from place to place the ship can be located on lakes and watercourses wherever it is desired; it can reach every dam step by passing through sluices. According to the invention the ship may be equipped with long suction pipes, through which water can be taken from any desired depth, and discharge (pressure) pipes. Due to the static pressure weighing on deep water, the water can be elevated by merely overcoming the frictional resistance; moreover, water can be caused to flow over or through the aerators by maintaining the water in the container means continuously at a lower level than the water in the lake or watercourse. The aerated water can be discharged through the discharge (pressure) pipe into any desired depth of the lake or watercourse, preferably after giving due consideration to the temperature or the specific gravity of the water. The ship, which may be equipped with a driving engine or motor, can be directed to any desired place and adjusted in proper relation to the depth of water by shortening or extending the feed and discharge pipes, which are designed for instance like a telescope.

The invention will now be described with reference to the accompanying diagrammatic drawings which are sectional views of a boat floating on a lake or watercourse and being adapted for treating water in accordance with the method of this invention, but it is to be understood that the invention will not be limited as to its scope by this description.

Fig. 5 is a diagrammatic view of a fifth embodiment of the invention wherein the aeration means are suspended between two ships.

Figs. 6 and 6a are side and rear diagrammatic views of a sixth embodiment of the invention wherein the aeration means are provided alongside the ship.

Fig. 7 is an enlarged fragmentary, elevational view of a siphon pipe arrangement such as shown in Fig. 3.

Fig. 8 is a diagrammatic view of a seventh embodiment of the invention wherein the pump is provided underwater.

Figure 1:
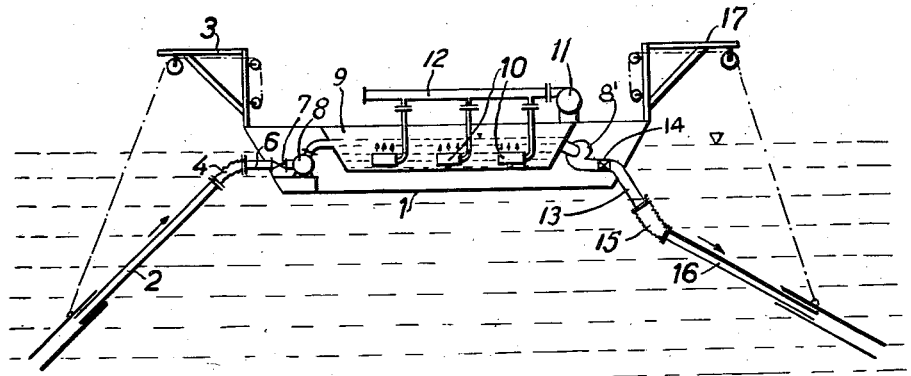
Fig. 1 is a diagrammatic view of one embodiment of the invention in operation wherein the intake and discharge pipes extend into the hull of the ship.

In Fig. 1 of the drawing, reference numeral 1 indicates a ship provided with the usual ship-driving mechanism. It has proved to be particularly advantageous to equip the ship with one or more of the known active rudders, which allow the ship to be guided and to change its course to all directions including transversely to the hull. Reference numeral 2 denotes an intake having tubular telescoping parts. The intake 2 can be elevated and lowered by means of a hoisting apparatus 3 and is fastened via a flexible tube 4 to a connection pipe 6, which extends through the ship's skin in a tight manner. This pipe 6 is connected through a valve 7 and a pump 8, to a tank 9 in the ship. The piping 2 and 4 can be tightly shut off by means of the slide valve 7 provided inside the ship between the flexible tube 4 and the pump 8. In the ship, within the watertight tank 9, are positioned a plurality of aerators 10 (comprising appropriately shaped bodies containing or consisting of material of preferably great porosity, for instance ceramic material). A blower 11 introduces air into these aerators 10 through the piping 12. The tank 9 may be designed in various manners.

The most simple apparatus for carrying out the herein described aerating process comprises a plate, the bottom of which is covered or partly covered with at least one aerator. Water is caused to flow through said plate lengthwise and air is passed through said aerator into the water. The aerating effect is increased by mounting in said plate baffle plates which are positioned and arranged so that an upwardly widening space is formed above each aerator. The water is led through these spaces wherein the air can bubble up without touching the surfaces of the baffle plates or the side walls of the plate. By varying the arrangement of the aerators and baffle plates the water can be led in co-current, counter current, cross current or in a combination of various directions of current in relation to the position and arrangement of the aerators, with a view to cause a mixing of water and air as intimate as possible, to prolong the time of contact and to prevent the fine gas bubbles from uniting to form bubbles of larger diameter, which would reduce the active surface of the air. Another means to prevent the small gas bubbles from uniting into larger bubbles consists in periodically interrupting the air current for a short time, for instance by supplying or injecting air intermittently, whereby the air—which bubbles up steadily when introduced continuously—is divided into single, distinctly visible zones which do not unite during their upward movement. The same result is obtained by causing the aerators 8 to move up and down at very short intervals.

The tank 9 may also be designed in the form of a tube and air may be introduced into the water under treatment through the pump 8. The tank 9 has an outlet pipe 13, which (as the intake) is tightly passed through the ship's skin and provided with a shutoff device 14 and discharges the water saturated with atmospheric oxygen through the flexible tube 15 and the pipe 16 into any desired depth of the lake or watercourse. The discharge pipe 16 can be brought to its proper position by means of the hoisting apparatus 17.

The intake and the discharge pipe may be suspended to lighters, boats, rafts, pontoons or other floating bodies if the water is to be drawn in or discharged farther away. The arrangement of a discharge pipe may eventually be dispensed with since water, which is lifted from deep layers, is colder than the water in the upper layers and, therefore, shows the tendency to sink again to the bottom of the lake or watercourse after aeration and issuing from the container means.

The afore described arrangement allows of discharging the water after aeration into the depth of the lake or watercourse where it is most efficacious for the biological decay of the contaminations or pollutions. The decomposition can further be promoted by continuously inoculating the water in the tank 9, for instance with a culture medium effecting biological decay in the desired direction, or by adding chemicals inhibiting or killing undesired bacteria, or chemicals (fertilizers) supporting the structure of biological life, or chemicals influencing the hydrogen ion concentration. The decay of organic matter gives rise in the first line to carbon dioxide. The carbon dioxide can be used under the influence of light from plants for the structure of new organic matter, which requires also oxygen on decaying. It may, therefore, be desired to continuously remove carbon from the cycle of aquatic life in lakes and watercourses. Decarbonization can be accomplished for instance by introducing to the water quicklime, which dissolves in water and yields calcium carbonate with the carbon dioxide produced in the decomposition of organic matter. This mineralization eliminates the carbon dioxide produced in the cycle of organic life in waters.

In the embodiment shown in Fig. 1, the water in the tank 9 is at a higher level than the water in the lake so that it can flow off freely. It is, of course, within the scope of the invention to maintain the water in the tank 9 below the level of the water in the lake. In the latter case, water flows into the tank through the pipe 2 without any expenditure of energy and the water level in the tank is kept below the level of the lake by means of a pump 8' which discharges the aerated water into the lake or watercourse through the discharge pipe 16.

Figure 2:
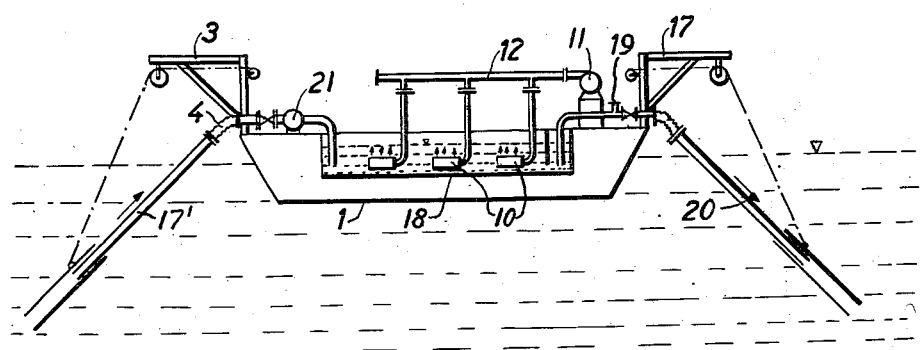
Fig. 2 is a diagrammatic view of a second embodiment of the invention wherein the intake and discharge pipes are arranged outside the hull of the ship.

The tight passages through the ship's skin are rendered superfluous by positioning and operating the pump externally (as shown in Fig. 2), wherein the intake 17' into the tank 18 so that the inlet opening of the intake is below the water level in the tank, and discharges the water of the tank, which is at a higher level than the water in the lake, by means of a siphon arrangement. The operation of the siphon is started by means of a vacuum producer 19. The water in the tank 18 may also be maintained below the level of the water in the lake or watercourse. In this case the directions of flow in the pipes 17' and 20 are interchanged; water is siphoned through the pipe 20 into the tank 18 and transferred overboard through the pipe 17' by the action of the pump 21. This embodiment may sometimes be of advantage since small amounts of gaseous substances are drawn off from the water during the upward pull caused by the vacuum. This is undesired as far as oxygen is concerned (described with reference to the embodiment shown in Fig. 1), but desired in the case of gases other than oxygen, for instance hydrogen sulfide. The power consumption is equal in the two cases.

It is preferable to provide the ship with a source of energy, for instance a dynamo operated by steam or diesel, to drive the pump and the blower.

Figure 3:
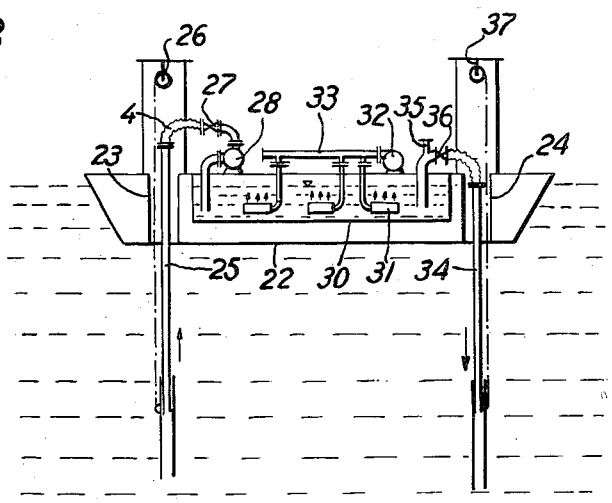
Fig. 3 is a diagrammatic view of a third embodiment of the invention wherein the intake and discharge pipes extend through the bottom of the ship.

Fig. 3 shows another embodiment of the invention. The hull of the ship 22 has two vertical passages 23 and 24 surrounded by watertight walls. In one of these passages a telescopic pipe 25 is suspended by a pulley block (or jack) 26. The intake 25 can be shut off by the slide valve 27. The pump 28 draws in water through the intake 25 and the flexible tube 4 and conveys it into the tank 30 where it is aerated by means of the aerators 31. The aerators 31 are supplied with air from the blower 32 through the piping 33. The water in the tank 30 is at a higher level than the water in the lake or river so that it can flow off freely from the tank 30 through the discharge pipe 34 by means of the siphon 35. The discharge tube 34, which is provided with the shutoff device 36, is comprised of two telescopic sections and suspended by the crane 37. This arrangement permits the discharge of the freshly aerated water into any desired depth of the lake or watercourse.

Steel pipes, also when constructed as a telescope, are heavy and expensive and liable to damages; furthermore, they may cause interference with the navigation of the ship in lakes and watercourses of great depths and high streaming velocities. These disadvantages can be avoided by the use of flexible tubes, for instance fire hoses. In this case the discharge tube is kept well-rounded by the water flowing off and the intake is rounded by the incoming water, which is drawn in by the action of a submerged pump arranged at the lower end of the intake, instead of the pump as shown. The submerged pump, the motor of which works below the water level, is suspended by the pulley block (or jack) 3 and connected with the dynamo positioned on the ship by an electrical cable. A slight porosity of the tubes will involve only small losses of water, which are negligible, as it is the case with hoses, but will not prevent the successful air-conditioning of water by the herein described methods.

Figure 4:
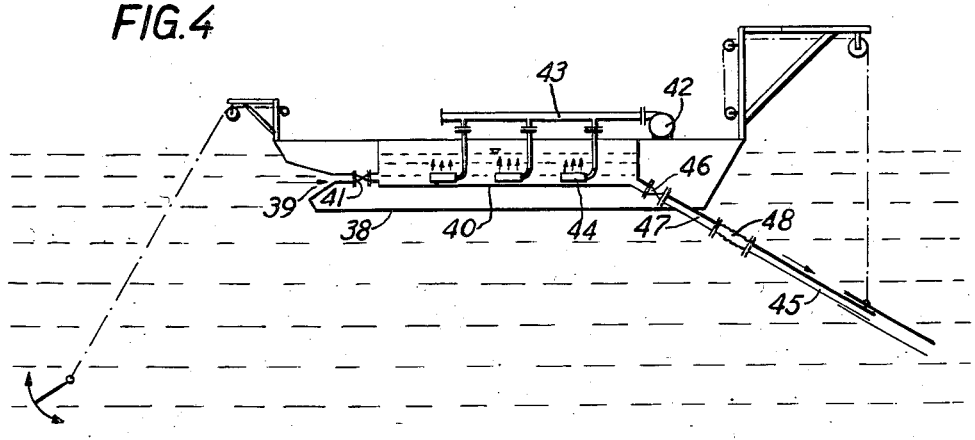
Fig. 4 is a diagrammatic view of a fourth embodiment of the invention wherein the hull of the ship is provided with a funnel-shaped intake positioned below the level of the surface of the water.

The arrangement of a pump can be dispensed with in the aeration of a stream or a navigable river with an appropriate velocity of flow. In this case, the embodiment shown, or similar to that shown, in Fig. 4 will be suitable. In Fig. 4, the ship 38, which is anchored, has at one end, below the water line, a funnel shaped intake 39 which opens into the tank 40 and can be shut off by means of the slide valve 41. The blower 42 introduces compressed air through the piping 43 into the aerators 44 arranged in the tank 40. The aerated water issues from the tank through the discharge pipe 45. The pipe 45 can be tightly shut off by means of the slide valve 46 and is tightly set in the skin of the ship. If required, the pipe 45 can be connected to an extension pipe 47 via a flexible tube 48 to discharge the aerated water into deep layers of the lake or river. It is, of course, also possible to connect a pipe to the intake 39 (e. g. a telescopic pipe) which allows of lifting water from the bottom and the deepest layers of the lake or river. The blower 42 can be operated on the ship by a self-contained source of energy but the current of a stream or river can also be utilized for this purpose; in the latter case, the ship is equipped with water wheels like ship mills.

Another very simple embodiment of the invention is shown in Fig. 5 and consists in mounting aerators 49 between two floating bodies or ships 50 and 51 below the water level of the lake or watercourse. A blower may be positioned on one of these floating bodies or on a bridge connecting the floating bodies with one another. Furthermore, aerators 52 may be fastened to the outer hull plating of the floating bodies by means of a tank 53 mounted on girders 54 suspended between the two ships. The pump 55 is mounted on ship 50 while the blower 56 is mounted on ship 51. The arrangement according to this embodiment may also be connected with the land or a bridge so that the air or the energy required for producing air is supplied from the dry land.

In Figs. 6 and 6a there is shown an arrangement wherein the aeration apparatus is provided outside the ship and adjacent one of its sides. In this embodiment, the aerators 57 are mounted on a support 52 which is connected to the side of the ship by connecting means 60. The blower 61 is provided on board the ship.

When using this type of apparatus, the ship is anchored in flowing water, and as the water flows by, it is aerated. If the water does not flow, as in a lake, the ship itself must be moved.

In Fig. 7 there is shown, in greater detail, a siphon device, such as shown in Fig. 3, wherein the outlet pipe 62 leading from the tank is provided with a connecting tube 63 which may be coupled to a vacuum pump, not shown. In such case, the pipe 64, extending upwardly from the water and connected to the outlet 62 through flexible hose 65 and valve 66, would receive the aerated water as a result of the siphoning action which would lift it through pipe 62 from the tank.

In Fig. 8, there is shown a device somewhat similar to that of Fig. 3 in that it comprises a ship 67 having vertical passages 68 and 69 through which telescopic pipes 70 and 71 extend, a center tank 72 in the ship, aerators 73 in the tank and a blower 74 above the tank for supplying compressed air to the aerators. However, instead of having the pump on the ship, as in Fig. 3, there is provided an underwater pump 75 driven by an underwater motor 76.

It may be of advantage to subject water taken from the lower layers or layers substantially near the bottom of a lake or watercourse to the hereinbefore described aeration treatment since such water is colder and heavier than the water of the upper layers and, therefore, can easily be returned after aeration to the lower layers or to the bottom of the lake or watercourse and, above all, will not tend to move up with its dissolved oxygen content.

Apart from the herein described air treatment methods by means of aerators of ceramic material, which have proved to be highly efficacious, the gasification of water may also be carried out by other means usually applied in the aeration of waste water, for instance scoop wheels, spraying devices, Kessener brushes and like equipments.

The aeration of lake water, which is rich in organic matters, according to the invention is more economic than the collection of waste waters on land and their treatment in waste water purifying plants specifically built for this purpose. The herein described methods and means allow of obtaining equally good results at essentially lower cost.

We claim:

1. A device for aerating a body of water comprising a floatable body, a tank in said floatable body, inlet and outlet means positioned on and movable with said body, said inlet and outlet means being connected to said tank and extending below said floatable body, to a predetermined position relative to said floatable body when said floatable body floats, means for passing water from said inlet, through said tank, and through said outlet, and aerating means in said tank, said aerating means being connected to a source of air and being positioned to pass air, in fine subdivision, from said source of air into the tank in the path of flow from said inlet to said outlet means.

2. The device of claim 1 wherein said means for passing water comprises a pump, and wherein said aerating means is constructed to pass the air therefrom under pressure.

3. The device of claim 1 wherein said inlet and outlet means comprise a plurality of relatively telescoping tubes which are adjustable for increasing or decreasing the lengths of the inlet and outlet means.

4. The device of claim 1 wherein a siphon means is provided for discharging the aerated water from said tank, and wherein a vacuum producing means is provided for initiating the operation of the siphon means.

5. The device of claim 1 wherein a pump is provided for discharging the aerated water through the outlet means.

6. The device of claim 1 wherein a pump, positioned outside said floatable body and adapted to be positioned below the surface of the body of water, is connected to the inlet means.

References Cited in the file of this patent

UNITED STATES PATENTS

| | | |
|---|---|---|
| 370,016 | Hyatt | Sept. 13, 1887 |
| 507,774 | Ball | Oct. 31, 1893 |
| 659,916 | Davis | Oct. 16, 1900 |
| 1,681,890 | Washburn | Aug. 21, 1928 |
| 1,907,691 | Wait | May 9, 1933 |
| 2,045,442 | Couch | June 23, 1936 |
| 2,330,164 | Wiedenhoefer | Sept. 21, 1943 |
| 2,379,554 | Tyler | July 3, 1945 |

FOREIGN PATENTS

| | | |
|---|---|---|
| 270,588 | Germany | Feb. 19, 1914 |